United States Patent
Schuijers

(10) Patent No.: US 12,247,878 B2
(45) Date of Patent: Mar. 11, 2025

(54) MULTI-/HYPERSPECTRAL TWO-DIMENSIONAL IMAGE PROCESSING

(71) Applicant: KONINKLIJKE PHILIPS N.V., Eindhoven (NL)

(72) Inventor: Erik Gosuinus Petrus Schuijers, Breda (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 298 days.

(21) Appl. No.: 17/639,942

(22) PCT Filed: Sep. 15, 2020

(86) PCT No.: PCT/EP2020/075683
§ 371 (c)(1),
(2) Date: Mar. 3, 2022

(87) PCT Pub. No.: WO2021/058318
PCT Pub. Date: Apr. 1, 2021

(65) Prior Publication Data
US 2022/0326079 A1  Oct. 13, 2022

(30) Foreign Application Priority Data
Sep. 27, 2019 (EP) .................................... 19200193

(51) Int. Cl.
*G01J 3/28* (2006.01)
*G06T 7/00* (2017.01)
(52) U.S. Cl.
CPC ........... *G01J 3/2823* (2013.01); *G01J 3/2803* (2013.01); *G06T 7/0012* (2013.01); *G01J 2003/2826* (2013.01); *G06T 2207/30088* (2013.01)

(58) Field of Classification Search
CPC ....... G01J 2003/2826; G01J 2003/2836; G01J 3/0208; G01J 3/0264; G01J 3/0272;
(Continued)

(56) References Cited

U.S. PATENT DOCUMENTS

| | | |
|---|---|---|
| 2006/0088212 A1 | 4/2006 | Ohmi |
| 2009/0137908 A1 | 5/2009 | Patwardhan |

(Continued)

FOREIGN PATENT DOCUMENTS

DE    102016216842 A1    3/2018

OTHER PUBLICATIONS

International Search Report and Written Opinion Dated Dec. 14, 2020 for International Application No. PCT/EP2020/075683 Filed Sep. 15, 2020.

(Continued)

*Primary Examiner* — Sunghee Y Gray

(57) ABSTRACT

There is provided an apparatus (100) comprising one or more processors (102) configured to acquire a multi-/hyperspectral two-dimensional image of an object at respective wavelengths. For at least one pixel of the image corresponding to a first point on an object surface, a set of intensity values for said at least one pixel is compared to a characteristic curve to determine a similarity measure. A first angle of the first point is estimated from the similarity measure or a correction is applied to the image at the first point using the similarity measure. The characteristic curve is a difference between a spectrum of at least one second point on the object surface at a second angle with respect to a plane of the image and a spectrum of at least one third point on the object surface at a third angle with respect to the plane of the image.

20 Claims, 7 Drawing Sheets

(58) Field of Classification Search
CPC .......... G01J 3/0289; G01J 3/28; G01J 3/2803; G01J 3/2823; G06T 2207/10016; G06T 2207/30088; G06T 2207/30201; G06T 7/0012; Y02E 50/30
USPC .......................................................... 356/328
See application file for complete search history.

(56) References Cited

U.S. PATENT DOCUMENTS

| | | |
|---|---|---|
| 2013/0076932 A1 | 3/2013 | Chhibber |
| 2014/0028801 A1 | 1/2014 | Tin |
| 2014/0240513 A1* | 8/2014 | Funamoto .............. H04N 23/56 |
| | | 348/164 |
| 2015/0374276 A1 | 12/2015 | Farkas |
| 2016/0132748 A1 | 5/2016 | Tillotson |
| 2017/0118449 A1* | 4/2017 | Tillotson .................. G01J 3/00 |

OTHER PUBLICATIONS

Kuo, et al: "Three-dimensional reconstruction of in vivo bioluminescent sources based on multispectral imaging", Journal of Biomedical Optics 12(2), 024007, Mar./Apr. 2007.

Gevaux, et al: "Three-dimensional hyperspectral imaging: A new method for human face acquisition", IS&T International Symposium on Electronic Imaging 2018, Material Appearance 2018, Jan. 2018.

* cited by examiner

MULTI-/HYPERSPECTRAL TWO-DIMENSIONAL IMAGE PROCESSING

CROSS REFERENCE TO RELATED APPLICATIONS

This application is the U.S. National Phase application under 35 U.S.C. § 371 of International Application No. PCT/EP2020/075683 filed Sep. 15, 2020, which claims the benefit of European Patent Application Number 19200193.1 filed Sep. 27, 2019. These applications are hereby incorporated by reference herein.

FIELD OF THE INVENTION

The disclosure relates to methods and apparatus for use in multi-/hyperspectral two-dimensional image processing.

BACKGROUND OF THE INVENTION

Traditional RGB cameras capture visible light using only three channels: a red, green and blue channel. Multi-/hyperspectral cameras capture the electromagnetic spectrum, both visible and invisible to the human eye, in a larger number of wavelengths (typically around 10 wavelengths for multi-spectral imaging or more than 100 wavelengths for hyperspectral imaging). As such, these multi-/hyperspectral cameras can reveal properties of an imaged object that are impossible to observe by the human eye.

Particularly, in the field of skin imaging, such multi-/hyperspectral cameras may be employed to estimate the concentration of chromophores present in the skin (e.g. melanin, carotenoids, water levels, lipids, etc.), which is not possible using traditional RGB cameras. The estimated concentration of chromophores in the skin can provide information about the health of the skin but also more generally can be indicative of lifestyle or systemic health. It is especially interesting to process multi-/hyperspectral images of large surfaces of skin, such as the human face. Tracking multi-/hyperspectral images over time may reveal particular local changes in chromophore concentrations that may be attributed to e.g. lifestyle changes. The process of estimating the chromophore concentrations from a spectrum is referred to as spectral decomposition. As an example, FIG. 1 shows calibrated hyperspectral images acquired at six different wavelengths of light; 448 nm, 494 nm, 610 nm, 669 nm, 812 nm and 869 nm. In FIG. 1, the pixel location is provided by the x and y axes, and the greyscale illustrates reflectance. The whiter the pixel, the higher the intensity and thus the higher the reflectance.

In order to allow for a proper estimation of the chromophores of a curved surface (e.g. the skin, such as the human face), the angle at which the curved surface is positioned with respect to the camera needs to be known. This angle is needed as light is absorbed, scattered and reflected in the different layers of the curved surface leading to a strong angular dependency. To arrive at such angular data, one or more three-dimensional (3D) cameras are typically installed, e.g. Time-of-Flight cameras, in order to register a 3D image and derive an angular map.

However, the use of 3D cameras in a multi-/hyperspectral setup is cumbersome and costly, since an additional camera is required and a two-dimensional (2D) multi-/hyperspectral image needs to be combined with the 3D image, which requires the use of advanced image registration techniques and accurate mapping of the 2D image with the 3D image. These limitations are especially apparent when moving towards consumer type of realizations. The use of one or more additional cameras prevent a small form factor.

SUMMARY OF THE INVENTION

As noted above, the limitations with existing techniques is that, in order to acquire information suitable for observing properties of an object (e.g. the concentration of chromophores in skin), an additional camera is required and a 2D multi-/hyperspectral image needs to be combined with a 3D image, which requires advanced image registration techniques and accurate mapping of the 2D image with the 3D image. It would thus be valuable to have an improvement aimed at addressing these limitations.

Therefore, according to a first aspect, there is provided an apparatus for estimating a first angle of a first point on a surface of an object from a multi-/hyperspectral two-dimensional image of the object at respective wavelengths or applying a correction to the multi-/hyperspectral two-dimensional image. The apparatus comprises one or more processors configured to acquire a multi-/hyperspectral two-dimensional image of an object at respective wavelengths. The multi-/hyperspectral two-dimensional image at the respective wavelengths is formed of a plurality of pixels. Each pixel has a set of intensity values corresponding to light intensity values for each of a plurality of wavelengths of light. The one or more processors are configured to, for at least one pixel of the plurality of pixels corresponding to a first point on a surface of the object, compare the set of intensity values for said at least one pixel to a characteristic curve for the object to determine a measure of similarity of the set of intensity values to the obtained characteristic curve. The one or more processors are configured to estimate a first angle of the first point on the surface of the object corresponding to said at least one pixel from the determined measure of similarity or apply a correction to the multi-/hyperspectral two-dimensional image at the first point on the surface of the object using the determined measure of similarity. The characteristic curve is indicative of a difference between a spectrum of at least one second point on the surface of the object at a second angle with respect to a plane of the image and a spectrum of at least one third point on the surface of the object at a third angle with respect to the plane of the image.

In some embodiments, the first angle may be with respect to the plane of the image. In some embodiments, the characteristic curve may characterize how the object reflects or absorbs light as a function of angle.

In some embodiments, the characteristic curve may be indicative of a difference between an average spectrum of at least two second points on the surface of the object at the second angle with respect to the plane of the image and a spectrum of at least two third points on the surface of the object at the third angle with respect to the plane of the image.

In some embodiments, the third angle may be a known angle that is different from or substantially different from the second angle. In some embodiments, the second angle may be about 0 degrees and/or the third angle may be an angle in a range from 45 to 90 degrees.

In some embodiments, the at least one second point on the surface of the object may comprise at least one brightest point on the surface of the object and/or the at least one third point on the surface of the object may comprise at least one dimmest point on the surface of the object.

In some embodiments, the at least one second point on the surface of the object may be identified by using landmark detection to detect at least one second point on the surface of the object at the second angle with respect to the plane of the image and/or the at least one third point on the surface of the object may be identified by using landmark detection to detect at least one third point on the surface of the object at the third angle with respect to the plane of the image.

In some embodiments, the characteristic curve may be predetermined using at least one other multi-/hyperspectral two-dimensional image of the same type of object or the characteristic curve may be determined using the multi-/hyperspectral two-dimensional image of the object.

In some embodiments, the one or more processors may be configured to, for at least one pixel of the plurality of pixels corresponding to at least one other first point on the surface of the object, compare the set of intensity values for said at least one pixel to the characteristic curve for the object to determine a measure of similarity of the set of intensity values to the obtained characteristic curve. In these embodiments, the one or more processors may be configured to estimate at least one other first angle of the at least one other first point on the surface of the object corresponding to said at least one pixel from the determined measure of similarity and derive an angular map comprising the estimated first angle and the estimated at least one other first angle.

In some embodiments, the characteristic curve for the object may comprise (or be selected from) a set of characteristic curves for a respective set of second and third angles.

In some embodiments, the spectrum of the at least one second point may comprise a reflectance spectrum indicative of the portion of light reflected from the object at the at least one second point on the surface of the object at the second angle with respect to the plane of the image or an absorbance spectrum indicative of the portion of light absorbed by the object at the at least one second point on the surface of the object at the second angle with respect to the plane of the image, and/or the spectrum of the at least one third point may comprise a reflectance spectrum indicative of the portion of light reflected from the object at the at least one third point on the surface of the object at the third angle with respect to the plane of the image or an absorbance spectrum indicative of the portion of light absorbed by the object by the object at the at least one third point on the surface of the object at the third angle with respect to the plane of the image.

In some embodiments, the object may be skin and the one or more processors may be configured to determine a concentration of chromophores in the skin from the multi-/hyperspectral two-dimensional image of the skin using the estimated first angle or from the multi-/hyperspectral two-dimensional image with the correction applied.

According to a second aspect, there is provided a method for estimating a first angle of a first point on a surface of an object from a multi-/hyperspectral two-dimensional image of the object at respective wavelengths or applying a correction to the multi-/hyperspectral two-dimensional image. The method comprises acquiring a multi-/hyperspectral two-dimensional image of an object at respective wavelengths, wherein the multi-/hyperspectral two-dimensional image at the respective wavelengths is formed of a plurality of pixels, each pixel having a set of intensity values corresponding to light intensity values for each of a plurality of wavelengths of light. The method comprises, for at least one pixel of the plurality of pixels corresponding to a first point on a surface of the object, comparing the set of intensity values for said at least one pixel to a characteristic curve for the object to determine a measure of similarity of the set of intensity values to the obtained characteristic curve. The method comprises estimating a first angle of the first point on the surface of the object corresponding to said at least one pixel from the determined measure of similarity or apply a correction to the multi-/hyperspectral two-dimensional image at the first point on the surface of the object using the determined measure of similarity. The characteristic curve is indicative of a difference between a spectrum of at least one second point on the surface of the object at a second angle with respect to a plane of the image and a spectrum of at least one third point on the surface of the object at a third angle with respect to the plane of the image.

In some embodiments, the first angle may be with respect to the plane of the image. In some embodiments, the characteristic curve may characterize how the object reflects or absorbs light as a function of angle. In some embodiments, the third angle may be a known angle that is different from or substantially different from the second angle.

According to a third aspect, there is provided an apparatus for determining a characteristic curve for use in estimating a first angle of a first point on a surface of an object from a multi-/hyperspectral two-dimensional image of the object at respective wavelengths or in applying a correction to the multi-/hyperspectral two-dimensional image. The apparatus comprises one or more processors configured to acquire a first spectrum of at least one second point on the surface of the object at a second angle with respect to a plane of the image, acquire a second spectrum of at least one third point on the surface of the object at a third angle with respect to the plane of the image, and determine the characteristic curve as a difference between the first spectrum and the second spectrum.

In some embodiments, the first angle may be with respect to the plane of the image. In some embodiments, the characteristic curve may characterize how the object reflects or absorbs light as a function of angle. In some embodiments, the third angle may be a known angle that is different from or substantially different from the second angle.

According to a fourth aspect, there is provided a method for determining a characteristic curve for use in estimating a first angle of a first point on a surface of an object from a multi-/hyperspectral two-dimensional image of the object at respective wavelengths or in applying a correction to the multi-/hyperspectral two-dimensional image. The method comprises acquiring a first spectrum of at least one second point on the surface of the object at a second angle with respect to a plane of the image, acquiring a second spectrum of at least one third point on the surface of the object at a third angle with respect to the plane of the image, and determining the characteristic curve as a difference between the first spectrum and the second spectrum.

In some embodiments, the first angle may be with respect to the plane of the image. In some embodiments, the characteristic curve may characterize how the object reflects or absorbs light as a function of angle. In some embodiments, the third angle may be a known angle that is different from or substantially different from the second angle.

According to a fifth aspect, there is provided a computer program product comprising a computer readable medium. The computer readable medium has a computer readable code embodied therein. The computer readable code is configured such that, on execution by a suitable computer or processor, the computer or processor is caused to perform the method described earlier.

According to the aspects and embodiments described above, the limitations of existing techniques are addressed. In particular, according to the above-described aspects and embodiments, the need for an additional camera and advanced image registration techniques for combining a 2D multi-/hyperspectral image with the 3D image is in order to acquire information suitable for observing properties of an object (e.g. the concentration of chromophores in skin) is overcome. A 3D imaging modality in multi-/hyperspectral imaging is no longer required. According to the above-described aspects and embodiments, angular information can be reliably derived directly from the multi-/hyperspectral image without the use of additional camera signals. This is realized by (deriving and) exploiting a characteristic curve. Alternatively, the multi-/hyperspectral image is pre-processed using the characteristic curve to compensate for the effects of angle on the spectrum.

There is thus provided useful techniques for estimating an angle of a point on a surface of an object from a multi-/hyperspectral two-dimensional image of the object at respective wavelengths or applying a correction to the multi-/hyperspectral two-dimensional image. There is also provided a useful technique for determining a characteristic curve for use in such an estimation or correction.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF THE EMBODIMENTS

As noted above, there is provided herein a technique for estimating an angle of a point on a surface of an object from a multi-/hyperspectral two-dimensional image of the object at respective wavelengths or applying a correction to the multi-/hyperspectral two-dimensional image. Herein, an object may be any type of object. In some embodiments, the object may be any object having a curved surface. In some embodiments, for example, the object may be skin or the (skin of the) face of a subject.

Figure 1:
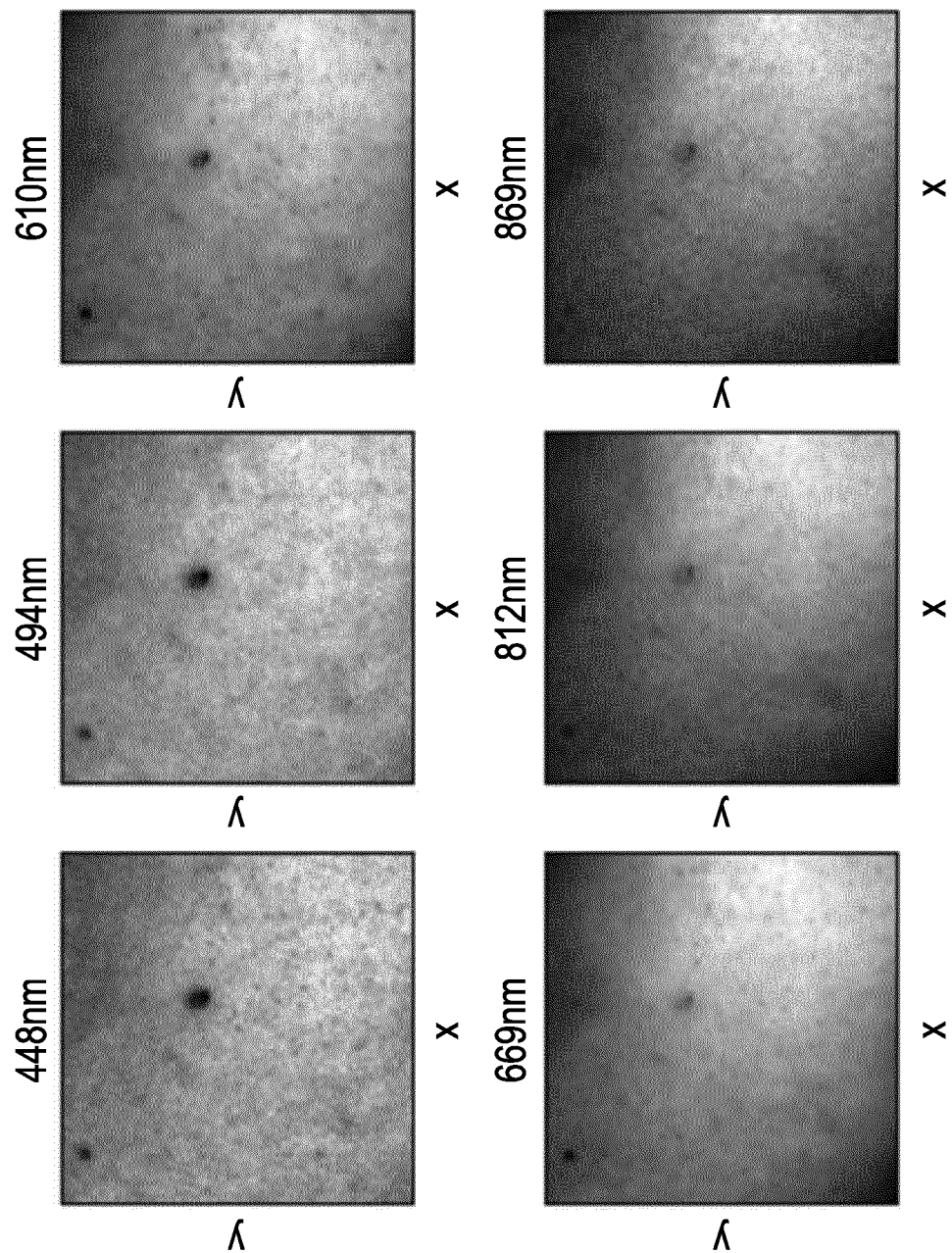
FIG. 1 is an example of hyperspectral images acquired at six different wavelengths of light.
Figure 2:
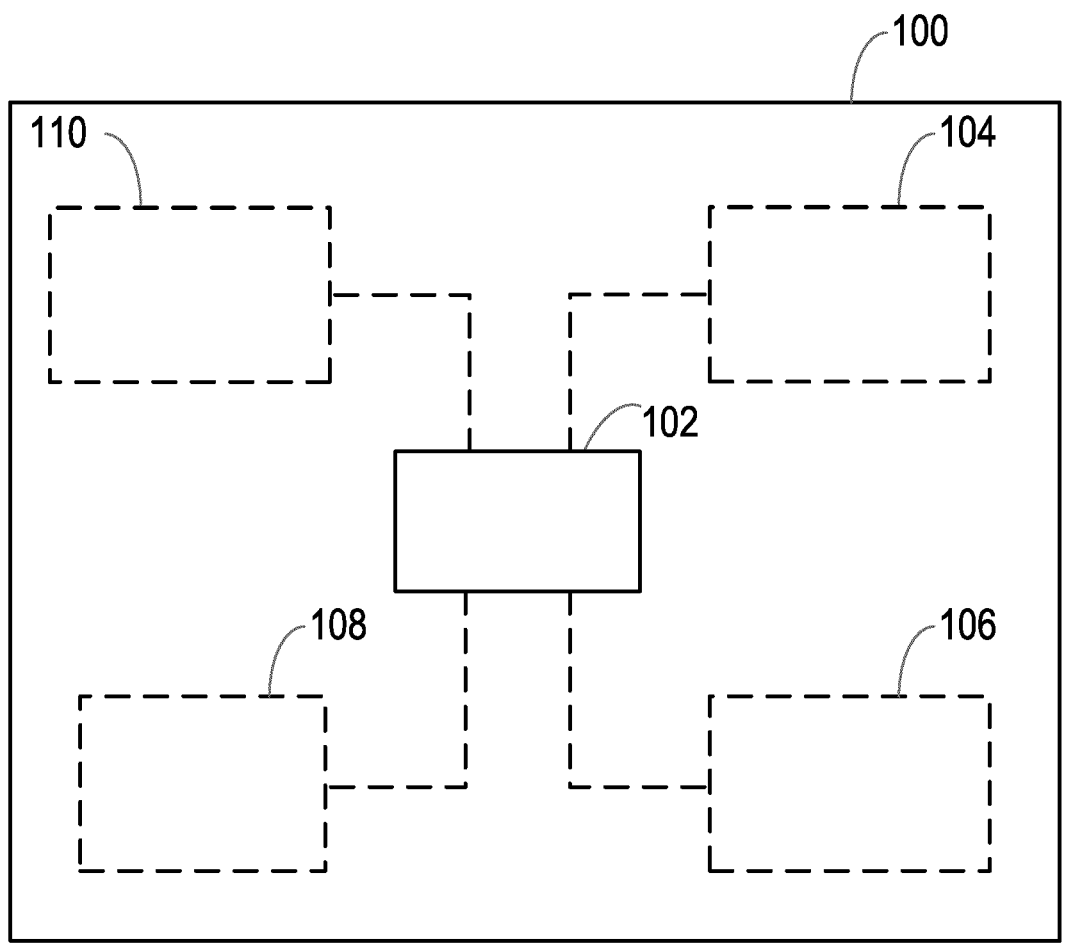
FIG. 2 is a schematic illustration of an apparatus according to an embodiment.

FIG. 2 illustrates an apparatus 100 for estimating a first angle of a first point on a surface of an object from a multi-/hyperspectral two-dimensional image of the object at respective wavelengths or applying a correction to the multi-/hyperspectral two-dimensional image according to an embodiment. In some embodiments, the apparatus 100 may be a device (e.g. a consumer device) or an attachment (or add-on) for a device. A device can, for example, be a phone (e.g. a smart phone), a tablet, or any other device. As illustrated in FIG. 2, the apparatus 100 comprises one or more processors 102.

The one or more processors 102 can be implemented in numerous ways, with software and/or hardware, to perform the various functions described herein. In particular implementations, the one or more processors 102 can comprise a plurality of software and/or hardware modules, each configured to perform, or that are for performing, individual or multiple steps of the method described herein. The one or more processors 102 may comprise, for example, one or more microprocessors, one or more multi-core processors and/or one or more digital signal processors (DSPs), one or more processing units, and/or one or more controllers (e.g. one or more microcontrollers) that may be configured or programmed (e.g. using software or computer program code) to perform the various functions described herein. The one or more processors 102 may be implemented as a combination of dedicated hardware (e.g. amplifiers, pre-amplifiers, analog-to-digital convertors (ADCs) and/or digital-to-analog convertors (DACs)) to perform some functions and one or more processors (e.g. one or more programmed microprocessors, DSPs and associated circuitry) to perform other functions.

Briefly, the one or more processors 102 of the apparatus 100 are configured to acquire a multi-/hyperspectral two-dimensional image of an object at respective wavelengths. The multi-/hyperspectral two-dimensional image at the respective wavelengths is formed of a plurality of pixels. Each pixel has a set of intensity values corresponding to light intensity values for each of a plurality of wavelengths of light. The one or more processors 102 of the apparatus 100 are also configured to, for at least one pixel of the plurality of pixels corresponding to a first point on a surface of the object, compare the set of intensity values for said at least one pixel to a characteristic curve for the object to determine a measure of similarity of the set of intensity values to the obtained characteristic curve. The one or more processors 102 of the apparatus 100 are also configured to estimate a first angle of the first point on the surface of the object corresponding to said at least one pixel from the determined measure of similarity or apply a correction to the multi-/hyperspectral two-dimensional image at the first point on the surface of the object using the determined measure of similarity.

The characteristic curve referred to herein is indicative of a difference between a spectrum of at least one second point on the surface of the object at a second angle with respect to a plane of the image and a spectrum of at least one third point on the surface of the object at a third angle with respect to the plane of the image.

Herein, the spectrum of the at least one second point may comprise a reflectance spectrum indicative of the portion of light reflected from the object at the at least one second point on the surface of the object at the second angle with respect to the plane of the image or an absorbance spectrum indicative of the portion of light absorbed by the object at the at least one second point on the surface of the object at the second angle with respect to the plane of the image. Alternatively or in addition, herein, the spectrum of the at least one third point may comprise a reflectance spectrum indicative of the portion of light reflected from the object at the at least one third point on the surface of the object at the third angle with respect to the plane of the image or an absorbance spectrum indicative of the portion of light absorbed by the object at the at least one third point on the surface of the object at the third angle with respect to the plane of the image. Herein, a reflectance spectrum can generally be understood to mean a relative amount of light reflected as a function of wavelength. Similarly, herein, an absorbance spectrum can generally be understood to mean a relative amount of light absorbed as a function of wavelength.

In some embodiments, the one or more processors 102 of the apparatus 100 can be configured to acquire the multi-/hyperspectral two-dimensional image of the object at respective wavelengths from an imaging sensor 104. The imaging sensor may, for example, be a camera or, more specifically, a multi-/hyperspectral camera. As illustrated in FIG. 2, in some embodiments, the apparatus 100 may comprise the imaging sensor 104. Alternatively or in addition, in some embodiments, the imaging sensor 104 may be external to (e.g. separate to or remote from) the apparatus 100. For example, another apparatus (or device, e.g. a capture device) may comprise the imaging sensor 104 according to some embodiments.

As illustrated in FIG. 2, in some embodiments, the apparatus 100 may comprise at least one memory 106. Alternatively or in addition, in some embodiments, at least one memory 106 may be external to (e.g. separate to or remote from) the apparatus 100. For example, another apparatus may comprise at least one memory 106 according to some embodiments. In some embodiments, a hospital database may comprise at least one memory 106, at least one memory 106 may be a cloud computing resource, or similar. The one or more processors 102 of the apparatus 100 may be configured to communicate with and/or connect to at least one memory 106. The at least one memory 106 may comprise any type of non-transitory machine-readable medium, such as cache or system memory including volatile and non-volatile computer memory such as random access memory (RAM), static RAM (SRAM), dynamic RAM (DRAM), read-only memory (ROM), programmable ROM (PROM), erasable PROM (EPROM), and electrically erasable PROM (EEPROM). In some embodiments, at least one memory 106 can be configured to store program code that can be executed by the one or more processors 102 of the apparatus 100 to cause the apparatus 100 to operate in the manner described herein.

Alternatively or in addition, at least one memory 106 can be configured to store information required by or resulting from the method described herein. For example, at least one memory 106 may be configured to store the multi-/hyperspectral two-dimensional image of the object, the determined measure of similarity, the estimated first angle of the first point on the surface of the object, the multi-/hyperspectral two-dimensional image of the object with the correction applied, or any other information, or any combination of information, required by or resulting from the method described herein. The one or more processors 102 of the apparatus 100 can be configured to control at least one memory 106 to store information required by or resulting from the method described herein.

As illustrated in FIG. 2, in some embodiments, the apparatus 100 may comprise at least one user interface 108. Alternatively or in addition, in some embodiments, at least one user interface 108 may be external to (e.g. separate to or remote from) the apparatus 100. The one or more processors 102 of the apparatus 100 may be configured to communicate with and/or connect to at least one user interface 108. In some embodiments, one or more processors 102 of the apparatus 100 can be configured to control at least one user interface 108 to operate in the manner described herein. A user interface 108 can be configured to render (or output, display, or provide) information required by or resulting from the method described herein. For example, in some embodiments, one or more user interfaces 108 may be configured to render (or output, display, or provide) any one or more of the multi-/hyperspectral two-dimensional image of the object, the determined measure of similarity, the estimated first angle of the first point on the surface of the object, the multi-/hyperspectral two-dimensional image of the object with the correction applied, or any other information, or any combination of information, required by or resulting from the method described herein. Alternatively or in addition, one or more user interfaces 108 can be configured to receive a user input. For example, one or more user interfaces 108 may allow a user to manually enter information or instructions, interact with and/or control the apparatus 100. Thus, one or more user interfaces 108 may be any one or more user interfaces that enable the rendering (or outputting, displaying, or providing) of information and/or enables a user to provide a user input.

The user interface 108 may comprise one or more components for this. For example, one or more user interfaces 108 may comprise one or more switches, one or more buttons, a keypad, a keyboard, a mouse, a display or display screen, a graphical user interface (GUI) such as a touch screen, an application (e.g. on a smart device such as a tablet, a smart phone, or any other smart device), or any other visual component, one or more speakers, one or more microphones or any other audio component, one or more lights (e.g. one or more light emitting diodes, LEDs), a component for providing tactile or haptic feedback (e.g. a vibration function, or any other tactile feedback component), a smart device (e.g. a smart mirror, a tablet, a smart phone, a smart watch, or any other smart device), or any other user interface, or combination of user interfaces. In some embodiments, one or more user interfaces that are controlled to render information may be the same as one or more user interfaces that enable the user to provide a user input.

As illustrated in FIG. 2, in some embodiments, the apparatus 100 may comprise at least one communications interface (or communications circuitry) 110. Alternatively or in addition, in some embodiments, at least one communications interface 110 may be external to (e.g. separate to or remote from) the apparatus 100. A communications interface 110 can be for enabling the apparatus 100, or components of the apparatus 100 (e.g. one or more processors 102, one or more sensors 104, one or more memories 106, one or more user interfaces 108 and/or any other components of the apparatus 100), to communicate with and/or connect to each other and/or one or more other components. For example, one or more communications interfaces 110 can be for enabling one or more processors 102 of the apparatus 100 to communicate with and/or connect to one or more sensors 104, one or more memories 106, one or more user interfaces 108 and/or any other components of the apparatus 100.

A communications interface 110 may enable the apparatus 100, or components of the apparatus 100, to communicate and/or connect in any suitable way. For example, one or more communications interfaces 110 may enable the apparatus 100, or components of the apparatus 100, to communicate and/or connect wirelessly, via a wired connection, or via any other communication (or data transfer) mechanism. In some wireless embodiments, for example, one or more communications interfaces 110 may enable the apparatus 100, or components of the apparatus 100, to use radio frequency (RF), Bluetooth, or any other wireless communication technology to communicate and/or connect.

Figure 3:
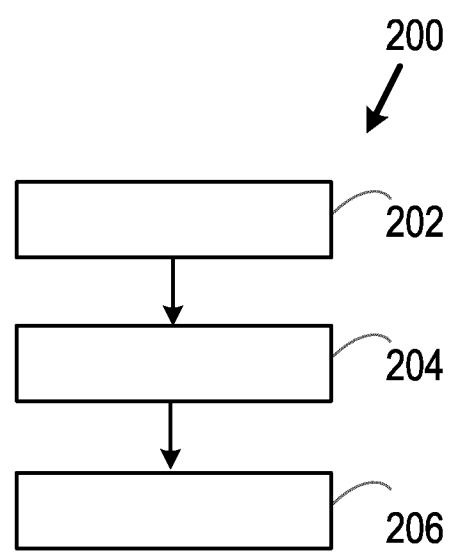
FIG. 3 is a flow chart illustrating a method according to an embodiment.

FIG. 3 illustrates a method 200 for estimating a first angle of a first point on a surface of an object from a multi-/ hyperspectral two-dimensional image of the object at respective wavelengths or applying a correction to the multi-/hyperspectral two-dimensional image according to an embodiment. More specifically, FIG. 3 illustrates a method 200 of operating the apparatus 100 described earlier with reference to FIG. 2 for estimating a first angle of a first point on a surface of an object from a multi-/hyperspectral two-dimensional image of the object at respective wavelengths or applying a correction to the multi-/hyperspectral two-dimensional image.

The method 200 illustrated in FIG. 3 is a computer-implemented method. As described earlier with reference to FIG. 2, the apparatus 100 comprises one or more processors 102. The method 200 illustrated in FIG. 3 can generally be performed by or under the control of the one or more processors 102 of the apparatus 100 described earlier with reference to FIG. 2.

With reference to FIG. 3, at block 202, a multi-/hyperspectral two-dimensional image of an object at respective wavelengths is acquired. As mentioned earlier, the multi-/hyperspectral two-dimensional image at the respective wavelengths is formed of a plurality of pixels. Each pixel having a set of intensity values corresponding to light intensity values for each of a plurality of wavelengths of light.

At block 204 of FIG. 3, for at least one pixel of the plurality of pixels corresponding to a first point on a surface of the object, the set of intensity values for said at least one pixel is compared to a characteristic curve (or profile) for the object to determine a measure of similarity of the set of intensity values to the obtained characteristic curve. As mentioned earlier, the characteristic curve referred to herein is indicative of the difference between the spectrum of the at least one second point on the surface of the object at the second angle with respect to the plane of the image and the spectrum of the at least one third point on the surface of the object at the third angle with respect to the plane of the image. The characteristic curve can be predetermined. In some embodiments, the characteristic curve may be a predetermined characteristic curve stored in a memory (e.g. a memory 106 of the apparatus 100 or any other memory). This can be advantageous since it reduces the computation complexity and avoids (manual) errors to improve accuracy.

The characteristic curve can be a curve that characterizes how the object reflects or absorbs light as a function of angle. In this way, it is possible to establish the extent to which the characteristic curve is present (or visible) for each spatial location (x, y). The extent to which the characteristic curve is present is a measure of the angle.

In more detail, in some embodiments, the characteristic curve can characterize how the object reflects (or absorbs) light as a function of angle according to the following equation:

Reflectance[$\lambda,\alpha$]=Reflectance[$\lambda,0$]=
$\alpha$*characteristic_curve[$\lambda$].

where $\lambda$ denotes wavelength and $\alpha$ denotes angle. Thus, if the reflectance spectrum of the object is measured under different angles, it can be observed that this reflectance spectrum can be decomposed into the reflectance spectrum at an angle of 0 degrees and a part that linearly depends on the angle. The extent to which the characteristic curve is available is then a measure of the angle. In terms of the correction to be applied to the multi-/hyperspectral two-dimensional image, this can comprise approximating the Reflectance[$\lambda$, 0] according to the above equation.

Thus, at block 204 of FIG. 3, for at least one pixel of the plurality of pixels corresponding to the first point on the surface of the object, the set of intensity values for said at least one pixel is compared to the characteristic curve for the object to determine the measure of similarity of the set of intensity values to the characteristic curve. In some embodiments, the set of intensity values for said at least one pixel may be compared directly to the characteristic curve to determine the measure of similarity. In other embodiments, one or more features may be derived from the set of intensity values for said at least one pixel and the one or more derived features may be compared to one or more corresponding features of the characteristic curve to determine the measure of similarity. Examples of the one or more features include, but are not limited to, a slope of a curve, a standard deviation of a curve, etc.

Herein, the spectrum of the at least one second point on the surface of the object at the second angle with respect to the plane of the image may be referred to as the baseline spectrum. Also, herein, the spectrum of the at least one third point on the surface of the object at the third angle with respect to the plane of the image may be referred to as the edge spectrum. Thus, the characteristic curve can be defined as the difference between the baseline spectrum and the edge spectrum.

In some embodiments, the measure of similarity that is determined at block 204 of FIG. 3 may comprise a measure of correlation. In some embodiments, the measure of similarity (e.g. the measure of correlation) may be determined using regression analysis. In an example, linear regression (or correlation) can be employed for at least one pixel of the plurality of pixels or on a pixel-by-pixel basis, e.g. for every x,y pair of pixels. This can be represented using a vector notation as follows:

$a=(p^Tp)^{-1}p^Td,$ where p is the characteristic curve (represented as a column vector), d is an input spectrum at position x,y (represented as a column vector) and a is the regression coefficient at position x,y, which establishes the extent to which the characteristic curve is present in the input spectrum. Thus, the regression coefficient a is the measure of similarity in this example. The operator T denotes a transposition. The input spectrum at position x,y is the set of intensity values for said at least one pixel described earlier, where the set of intensity values correspond to the light intensity values for each of the plurality of wavelengths $\lambda$ of light.

In some embodiments, the input spectrum d may directly be the vector $s=s[\lambda, x, y]$ for a given x,y coordinate and the plurality of wavelengths $\lambda$. Alternatively, the input spectrum d may be baseline compensated by subtracting the baseline spectrum, such that $d[\lambda]=s[\lambda,x, y]-s_{baseline}[\lambda]$ for a given x,y coordinate for the plurality of wavelengths $\lambda$. This can result in improved robustness.

Returning back to FIG. 3, at block 206, a first angle of the first point on the surface of the object corresponding to said at least one pixel is estimated from the determined measure of similarity or a correction is applied to the multi-/hyperspectral two-dimensional image at the first point on the surface of the object using the determined measure of similarity. The first angle can be with respect to the plane of the image. Thus, angular information may be derived from the multi-/hyperspectral image by exploiting the characteristic curve or the multi-/hyperspectral image may be pre-processed using the characteristic curve. In some embodiments where the regression coefficient a is the measure of similarity, the regression coefficient a may be a direct estimate of the first angle of the first point on the surface of the object corresponding to said at least one pixel. For example, in some embodiments, the first angle of the first point on the surface of the object corresponding to said at least one pixel may be estimated as follows:

$$\alpha = \min(\max(c \cdot a, 0), \pi/2),$$

where c is a predetermined constant, and the min, max operator prevents angles being estimated outside the range [0, pi/2].

In some embodiments where the correction is applied to the multi-/hyperspectral two-dimensional image at the first point on the surface of the object, the multi-/hyperspectral image can be pre-processed in order to compensate for the effects of angle. In some embodiments, the correction may comprise flattening the image. In some embodiments, preprocessing of the spectrum s[λ, x, y] for a given coordinate x, y and the plurality of wavelengths λ, may be realized by establishing the residual after regression, as follows:

$$s_{preprocessed}[\lambda, x, y] = s[\lambda, x, y] - a[x, y] \cdot s_{characteristic}[\lambda].$$

In some embodiments, a set of characteristic curves may be stored in a memory (e.g. a memory 106 of the apparatus 100 or any other memory). In some of these embodiments, at block 204 of FIG. 3, for at least one pixel of the plurality of pixels corresponding to the first point on the surface of the object, the set of intensity values for said at least one pixel may be compared to each characteristic curve in the set of characteristic curves to determine respective measures of similarity of the set of intensity values to the characteristic curves. The characteristic curve in the set of characteristic curves that is most similar to (i.e. best matches) the set of intensity values is selected. For example, a best fit technique may be used. In some embodiments, each characteristic curve in the set of characteristic curves may be stored with a corresponding angle, e.g. in the form of a look-up table. Thus, in these embodiments, at block 206 of FIG. 3, the first angle may be determined as the angle that is stored with the selected characteristic curve. Alternatively, at block 206 of FIG. 3, the selected characteristic curve may be used to correct the set of intensity values.

There is also provided herein an apparatus for determining a characteristic curve for use in estimating a first angle of a first point on a surface of an object from a multi-/hyperspectral two-dimensional image of the object at respective wavelengths as described herein or in applying a correction to the multi-/hyperspectral two-dimensional image as described herein. The apparatus comprises one or more processors as described earlier with reference to FIG. 2 and may also comprise any one or more of the other components of the apparatus 100 described earlier with reference to FIG. 2.

In some embodiments, the apparatus for determining the characteristic curve may be the same apparatus 100 as described earlier with reference to FIG. 2. Thus, in some embodiments, the apparatus 100 described earlier with reference to FIG. 2 can also be for determining the characteristic curve referred to herein. Alternatively, in some embodiments, the apparatus for determining the characteristic curve referred to herein may be a different apparatus to the apparatus 100 described earlier for estimating the first angle of the first point on the surface of the object from a multi-/hyperspectral two-dimensional image of the object at respective wavelengths as described herein or in applying the correction to the multi-/hyperspectral two-dimensional image as described herein.

Briefly, the one or more processors of the apparatus for determining the characteristic curve are configured to acquire the first spectrum of the at least one second point on the surface of the object at the second angle with respect to the plane of the image, acquire the second spectrum of the at least one third point on the surface of the object at the third angle with respect to the plane of the image and determine the characteristic curve as the difference between the first spectrum and the second spectrum.

Figure 4:
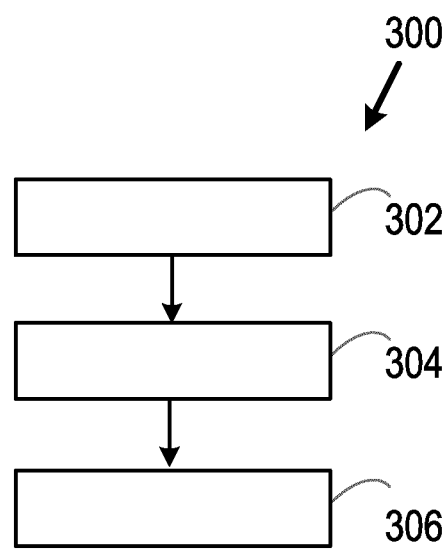
FIG. 4 is a flow chart illustrating a method according to an embodiment.

FIG. 4 illustrates a method 300 for determining a characteristic curve for use in estimating a first angle of a first point on a surface of an object from a multi-/hyperspectral two-dimensional image of the object at respective wavelengths or in applying a correction to the multi-/hyperspectral two-dimensional image according to an embodiment. More specifically, FIG. 4 illustrates a method 300 of operating the apparatus for determining a characteristic curve.

The method 300 illustrated in FIG. 4 is a computer-implemented method. As mentioned earlier, the apparatus for determining the characteristic curve comprises one or more processors. The method 300 illustrated in FIG. 4 can generally be performed by or under the control of the one or more processors of the apparatus.

With reference to FIG. 4, at block 302, the first spectrum of the at least one second point on the surface of the object at the second angle with respect to the plane of the image is acquired. At block 304 of FIG. 4, the second spectrum of the at least one third point on the surface of the object at the third angle with respect to the plane of the image is acquired. At block 306 of FIG. 4, the characteristic curve is determined as the difference between the first spectrum and the second spectrum.

In some embodiments, a method may comprise blocks 302 to 306 of FIG. 4 and blocks 202 to 206 of FIG. 3. For example, the method may comprise blocks 302 to 306 of FIG. 4 followed by blocks 202 to 206 of FIG. 3. Alternatively, for example, the method may comprise block 202 of FIG. 3, followed by blocks 302 to 306 of FIG. 4, followed by blocks 204 to 206 of FIG. 3, or any other suitable order of blocks.

As mentioned earlier, the characteristic curve referred to herein is indicative of the difference between the spectrum of the at least one second point on (e.g. the plane of) the surface of the object at the second angle with respect to the plane of the image and the spectrum of the at least one third point on (e.g. the plane of) the surface of the object at the third angle with respect to the plane of the image.

The second angle referred to herein may instead be defined as a second angle with respect to a plane of the optical lens of the imaging sensor. Similarly, the third angle referred to herein may instead be defined as a third angle with respect to a plane of the optical lens of the imaging sensor. In some embodiments, the characteristic curve may be indicative of a difference between an average spectrum of at least two second points on (e.g. the plane of) the surface of the object at the second angle with respect to the plane of the image and a spectrum of at least two third points on (e.g. the plane of) the surface of the object at the third angle with respect to the plane of the image. In some embodiments, the third angle may be a known angle that is different from or substantially different from the second angle.

In some embodiments, the second angle referred to herein may be about 0 degrees. That is, in some embodiments, the at least one second point on the surface of the object may be at about 0 degrees with respect to (or parallel or substantially/approximately parallel to) the plane of the image. Put differently, in some embodiments, the at least one second point on the surface of the object may be at about 0 degrees with respect to (or parallel or substantially/approximately parallel to) the plane of an optical lens of the imaging sensor. Thus, in some embodiments, the second angle may be such that (e.g. the plane of) the surface of the object at the second point and the plane of the image (or the plane of the optical lens of the imaging sensor) are parallel or substantially/approximately parallel. The baseline spectrum mentioned earlier can thus be a representative spectrum for location(s) where the plane of the image (or the plane of the optical lens of the imaging sensor) is parallel or substantially/approximately parallel to (e.g. the plane of) the surface of the object.

Alternatively or in addition, in some embodiments, the third angle referred to herein may be an angle in a range from 45 to 90 degrees, for example an angle in a range from 50 to 85 degrees, for example an angle in a range from 55 to 80 degrees, for example an angle in a range from 60 to 75 degrees. For example, in some embodiments, the third angle referred to herein may be an angle selected from 45 degrees, 50 degrees, 55 degrees, 60 degrees, 65 degrees, 70 degrees, 75 degrees, 80 degrees, 85 degrees, 90 degrees, or any integer or non-integer value between these values.

Thus, in some embodiments, the at least one third point on the surface of the object may be 45 to 90 degrees with respect to (or parallel or substantially/approximately perpendicular to) the plane of the image. Put differently, in some embodiments, the at least one third point on the surface of the object may be at 45 to 90 degrees with respect to (or perpendicular or substantially/approximately perpendicular to) the plane of an optical lens of the imaging sensor. Thus, in some embodiments, the third angle may be such that (e.g. the plane of) the surface of the object at the third point and the plane of the image (or the plane of the optical lens of the imaging sensor) are perpendicular or substantially/approximately perpendicular. The edge spectrum mentioned earlier can thus be a representative spectrum for location(s) where the plane of the image (or the plane of the optical lens of the imaging sensor) is perpendicular or substantially/approximately perpendicular to (e.g. the plane of) the surface of the object.

In some embodiments, the second angle and the third angle may be switched. For example, in some embodiments, the second angle referred to herein may be an angle in a range from 45 to 90 degrees and/or the third angle referred to herein may be about 0 degrees. In these embodiments, the difference between the spectrum of at least one second point on (e.g. the plane of) the surface of the object at the second angle with respect to the plane of the image and the spectrum of at least one third point on (e.g. the plane of) the surface of the object at the third angle with respect to the plane of the image will have a different sign, e.g. a minus sign. Thus, in these embodiments, there is a minus sign in subsequent computations.

In some embodiments, the at least one second point on the surface of the object may comprise at least one brightest point (or the average brightest points) on the surface of the object and/or the at least one third point on the surface of the object may comprise at least one dimmest point (or the average dimmest points) on the surface of the object. The at least one brightest point on the surface of the object can, for example, be at least one point on the surface of the object where the second angle is about 0 degrees. The at least one dimmest point on the surface of the object can, for example, be at least one point on the surface of the object where the third angle is about 90 degrees. In some embodiments where the object is the face of a subject, the at least one second point on the surface of the object may be at least one second point on the surface of the tip of the nose on the face of the subject and/or the at least one third point on the surface of the object may be at least one third point on the surface of the edge of the face of the subject.

In some embodiments, the at least one second point on the surface of the object may be identified by using landmark detection to detect at least one second point on the surface of the object at the second angle with respect to the plane of the image. Alternatively or in addition, the at least one third point on the surface of the object may identified by using landmark detection to detect at least one third point on the surface of the object at the third angle with respect to the plane of the image. A person skilled in the art will be aware of established technology that can be used for landmark (e.g. facial landmark) detection in this way.

In some embodiments, a plurality of second points on the surface of the object may be identified to detect at least one second point on the surface of the object at the second angle with respect to the plane of the image and/or a plurality of third points on the surface of the object may be identified to detect at least one third point on the surface of the object at the third angle with respect to the plane of the image. In other words, measurements may be made over multiple locations. Alternatively or in addition, filtering may be employed. In this way, a more robust characteristic curve may be determined.

Thus, in the manner described above, the at least one second point on the surface of the object may be identified and the baseline spectrum acquired. Similarly, in this way, the at least one third point on the surface of the object may identified and the edge spectrum acquired. In some embodiments, the baseline spectrum can be acquired by the one or more processors 102 of the apparatus 100 obtaining the baseline from another apparatus or device, by the one or more processors 102 of the apparatus 100 obtaining the baseline from a memory (such as the memory of the apparatus 100 or another memory), or by the one or more processors 102 of the apparatus 100 determining the baseline spectrum. Similarly, in some embodiments, the edge spectrum can be acquired by the one or more processors 102 of the apparatus 100 obtaining the baseline from another apparatus or device, by the one or more processors 102 of the apparatus 100 obtaining the baseline from a memory (such as the memory of the apparatus 100 or another memory), or by the one or more processors 102 of the apparatus 100 determining the edge spectrum.

As an example, the baseline spectrum $s_{baseline}[\lambda]$ and the edge spectrum $s_{edge}[\lambda]$ may be determined by weighting of the multi-/hyperspectral spectra $s[\lambda, x, y]$, where x is the x-coordinate in the multi-/hyperspectral two-dimensional image, y is the y-coordinate in the multi-/hyperspectral two-dimensional image and $\lambda$ is the wavelength index indicative of the wavelength of light:

$$s_{baseline}[\lambda] = \sum_{\forall x,y} w_{baseline}[x, y] \cdot s[\lambda, x, y]$$

$$s_{edge}[\lambda] = \sum_{\forall x,y} w_{edge}[x, y] \cdot s[\lambda, x, y]$$

In this example, the weight matrices sum up to unity:

$$\sum_{\forall x,y} w_{baseline}[x, y] = 1$$

$$\sum_{\forall x,y} w_{edge}[x, y] = 1$$

The weight matrices of this example may be derived by transforming the output of a (e.g. facial) landmark detection using a fixed processing step, ensuring that weights at the at least one second point (e.g. at the tip of the nose) are high for $w_{baseline}[x, y]$ and weights around the at least one third point (e.g. around the edge of the face, such as the jawline) are high for $w_{edge}[x, y]$.

Following on from this example, the characteristic curve may be determined as follows:

$$s_{characteristic}[\lambda] = s_{edge}[\lambda] - s_{baseline}[\lambda].$$

Figure 5:
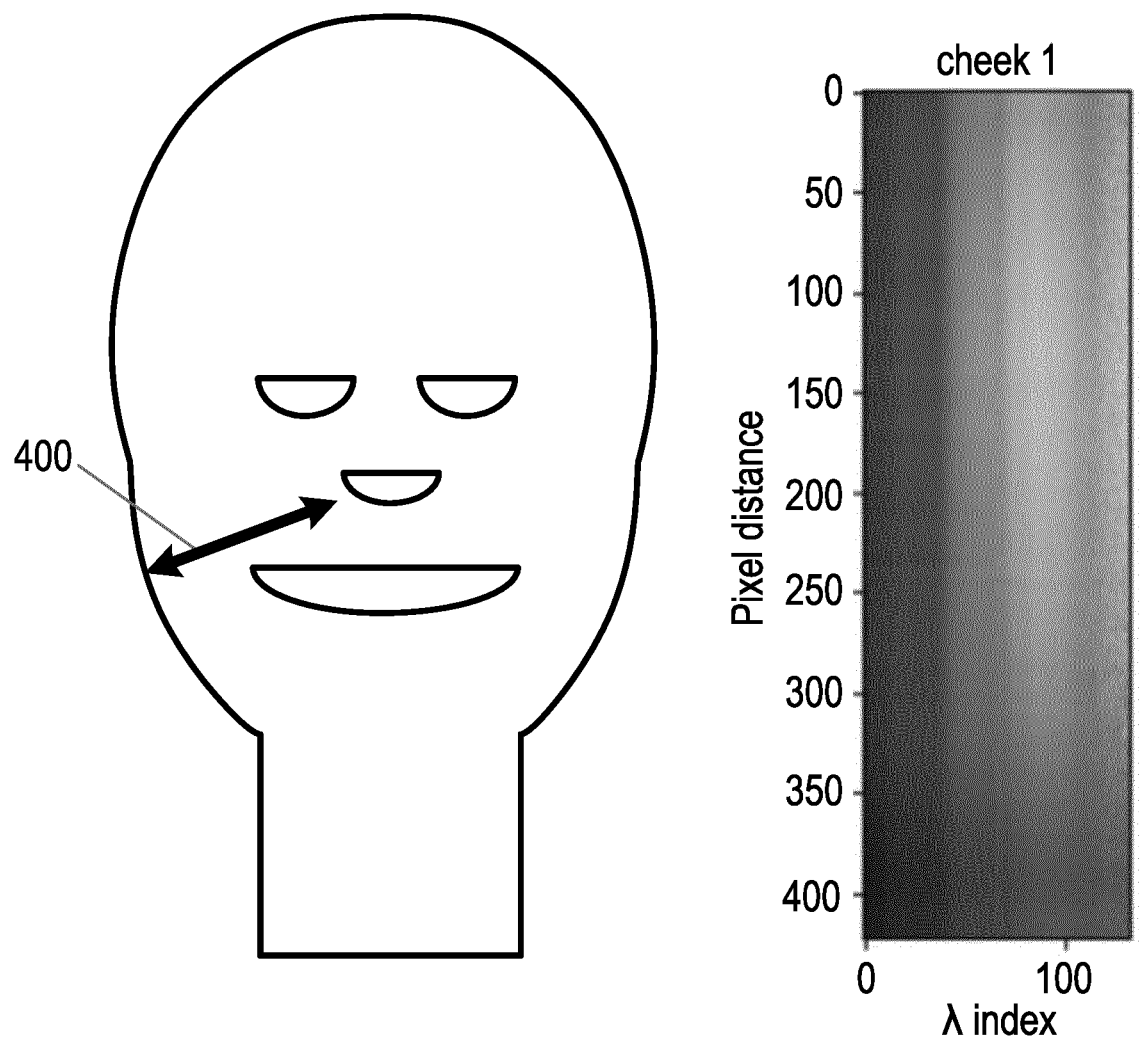
FIG. 5 is an example schematic illustration of a hyperspectral image together with a hyperspectral map of a slice from that image.

FIG. 5 is an example schematic illustration of a hyperspectral image (on the left) together with a hyperspectral map of a slice from that image (on the right). In this example, the hyperspectral image may be a calibrated reflectance image at a certain (arbitrary) wavelength. The hyperspectral image is formed of a plurality of pixels, each pixel having a set of intensity values corresponding to light intensity values for each of a plurality of wavelengths of light. The arrow 400 in the hyperspectral image indicates the location of the hyperspectral slice. That is, the arrow 400 in the image indicates the line along which a corresponding hyperspectral cube (x, y, wavelength) is sliced.

As illustrated in FIG. 5, in this example, the at least one second point on the surface of the object at the second angle with respect to the plane of the image referred to herein comprises a point on the surface of the face (which is the object in this example) that is close to the nose. This is a point where the skin is (e.g. substantially or approximately) parallel to the plane of the image or to the plane of an optical lens of the imaging sensor. This point may also be referred to as the starting point of the hyperspectral slice. As also illustrated in FIG. 5, in this example, the at least one third point on the surface of the object at the third angle with respect to the plane of the image referred to herein comprises a point on the surface of the face (which is the object in this example) at the edge of the face (just below the ear). This is a point where the skin is (e.g. substantially or approximately) perpendicular to the plane of the image or to the plane of an optical lens of the imaging sensor. This point may also be referred to as the end point of the hyperspectral slice.

The hyperspectral map of the slice from the image indicates the distance (or, more specifically, the pixel distance) from the starting point of the hyperspectral slice (which is illustrated on the vertical axis) versus the wavelength ($\lambda$) index (on the horizontal axis). In this example, the wavelength index covers wavelengths in a range from 428 to 1063 nm. The starting point of the hyperspectral slice is indicated by zero. The hyperspectral map of the slice from the image shows the light intensity values for each of the plurality of wavelengths of light at the different distances from the starting point. The whiter the pixel, the higher the light intensity value and thus the higher the reflectance. As can be seen from the hyperspectral map of the slice from the image, the way that the individual wavelengths begin to differ from the starting point (at zero) is different. This spectral dependency as a function of distance, and thereby angle, becomes clearer after the actual difference from a first row is observed.

Figure 6:
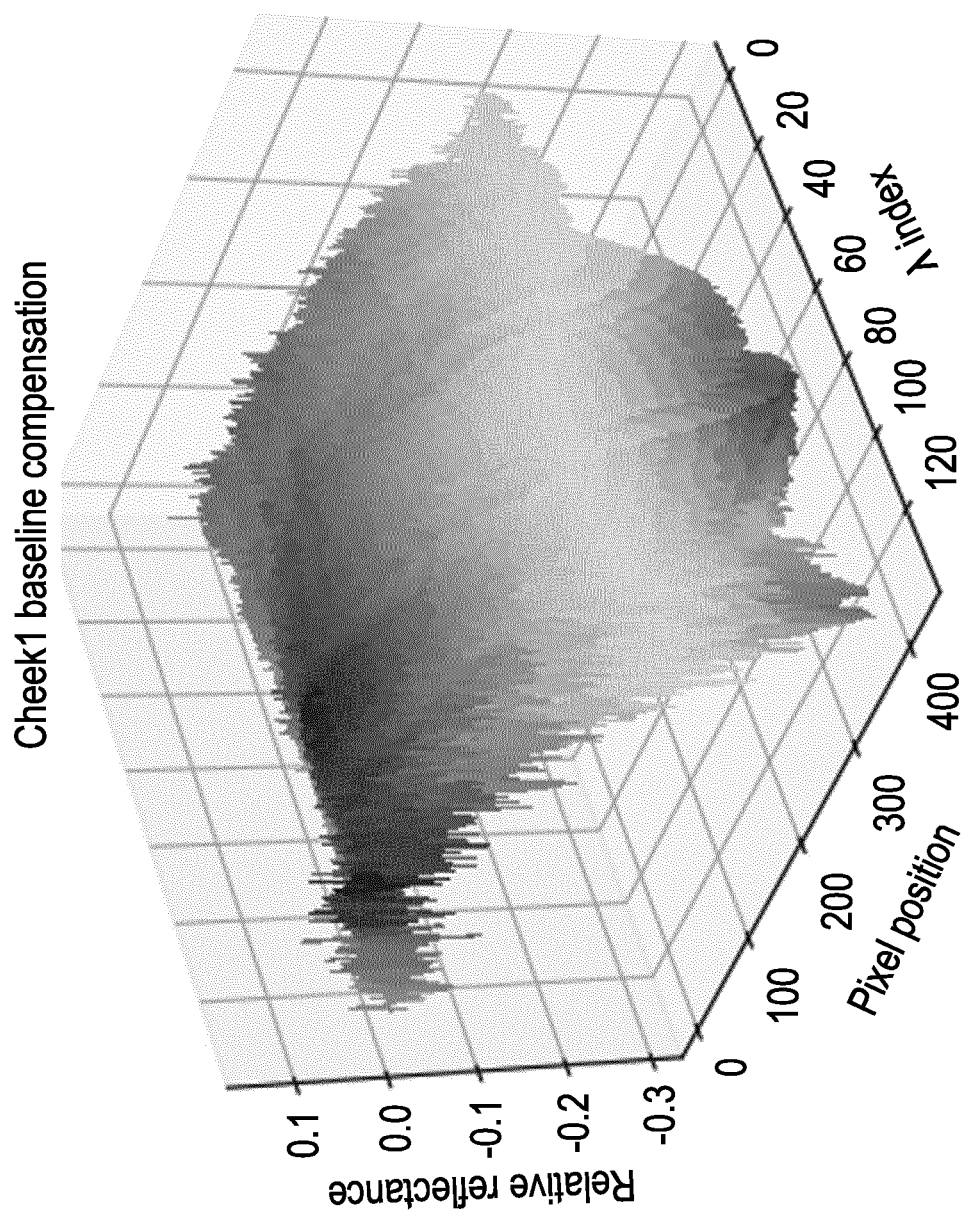
FIG. 6 is an example of a change in calibrated hyperspectral image as a function of distance.

FIG. 6 illustrates the change in a calibrated hyperspectral image as a function of distance (or, more specifically, the pixel distance) from the starting point of the hyperspectral slice and as a function of wavelength ($\lambda$) index. More specifically, in FIG. 6, the relative reflectance is illustrated as a function of pixel position and $\lambda$ index. The $\lambda$ index covers wavelengths in a range from 428 to 1063 nm. The starting point of the hyperspectral slice is indicated by zero. The relative reflectance is the relative reflectance with respect to the starting point. As illustrated in FIG. 6, as the distance from the starting point of the hyperspectral slice increases, a more and more distinct pattern can be observed.

Figure 7:
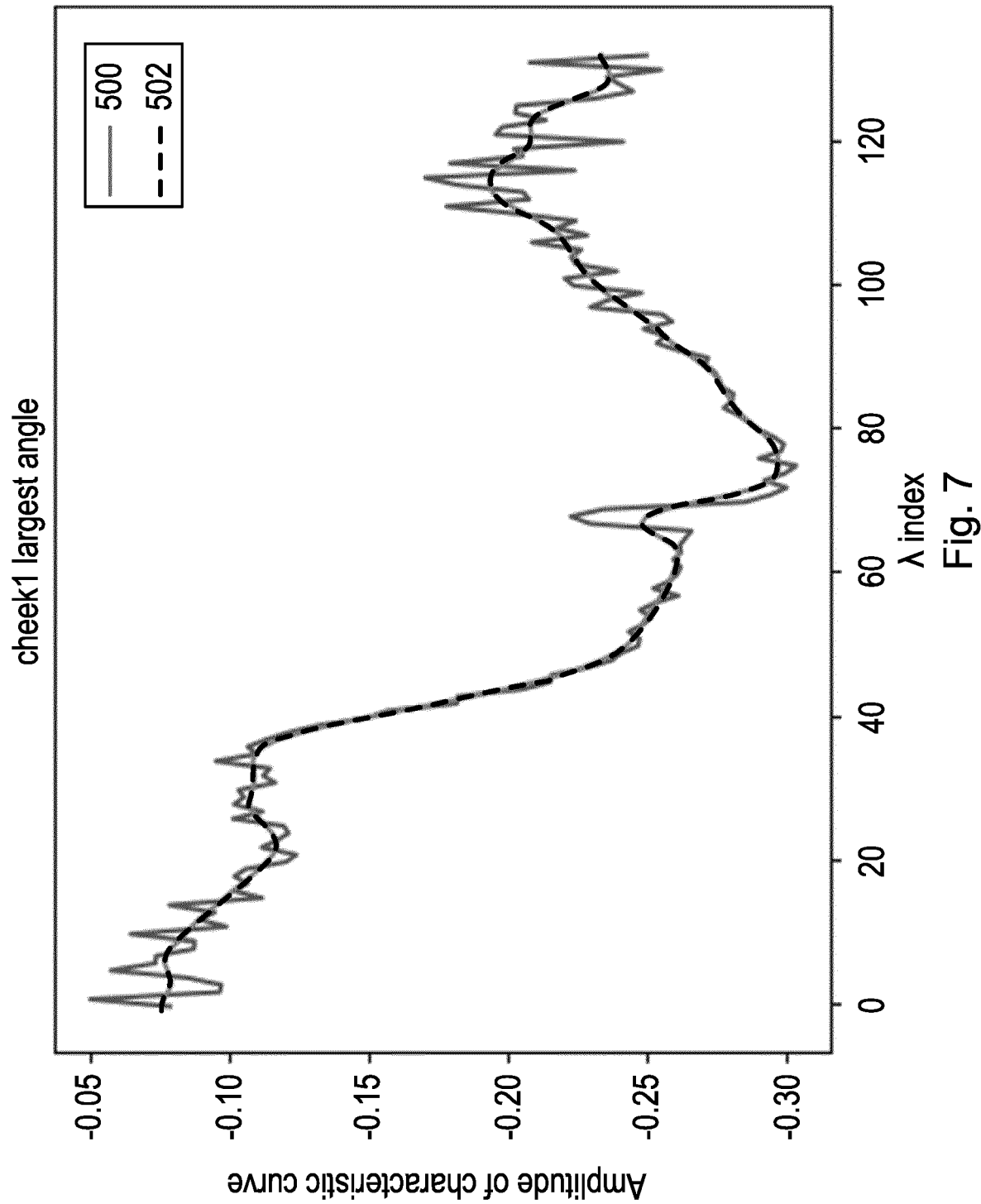
FIG. 7 is an example of a characteristic curve.

FIG. 7 is an example of a characteristic curve. In this example, the characteristic curve that is illustrated is a characteristic curve at the maximum (angular) distance from the starting point of the hyperspectral slice. FIG. 7 illustrates an unfiltered version of the characteristic curve 500 and a filtered version of the characteristic curve 502. The horizontal axis in FIG. 7 shows the wavelength ($\lambda$) index, which in this example indexes wavelengths non-uniformly sampled in a range from 428 to 1063 nm. The vertical axis in FIG. 7 shows the difference in spectrum compared to original location or, more specifically, the amplitude of the characteristic curve. That is, the vertical axis shows the difference between a spectrum of the at least one second point on the surface of the object at the second angle with respect to the plane of the image (or the plane of an optical lens of the imaging sensor) and the spectrum of the at least one third point on the surface of the object at the third angle with respect to the plane of the image (or the plane of an optical lens of the imaging sensor). The characteristic curve indicates how the spectrum changes as a function of distance and thereby angle.

In some embodiments, the characteristic curve referred to herein may be predetermined (e.g. pre-calculated) using at least one other multi-/hyperspectral two-dimensional image of the same type of object. For example, in embodiments where the object is the skin of a subject, the characteristic curve referred to herein may be predetermined (e.g. pre-calculated) using at least one other multi-/hyperspectral two-dimensional image of the skin of the subject and/or at least one other multi-/hyperspectral two-dimensional image of the skin of one or more other subjects, e.g. with different skin types. In some of these embodiments, the characteristic curve referred to herein may be stored in a memory (e.g. a memory 106 of the apparatus or another memory), such as in the form of a table of values. In some embodiments, the type of object (e.g. the skin type where the object is skin) may first be established based on the spectrum and the type of object may then be indexed in the memory, such as in the form of a table. In some of these embodiments, each type of object may have a characteristic curve that is predetermined (e.g. pre-calculated).

In other embodiments, the characteristic curve referred to herein may be determined (e.g. calculated) using the multi-/hyperspectral two-dimensional image of the object. For example, in embodiments where the object is the skin of a subject, the characteristic curve referred to herein may be determined (e.g. calculated) using the multi-/hyperspectral two-dimensional image of the skin of the subject. Thus, in some embodiments, the characteristic curve can be determined based on the actual image data.

In some embodiments, the characteristic curve described herein may comprise a set of characteristic curves for a respective set of second and third angles. In some embodiments, the characteristic curve described herein may be selected from a set of characteristic curves for a respective set of second and third angles. In these embodiments, once an image is acquired, a characteristic curve for the object in the image may be selected from a set of characteristic curves.

As mentioned earlier, in some embodiments, the characteristic curve for the object may be a predetermined characteristic curve stored in a memory (e.g. a memory 106 of the apparatus 100 or any other memory), e.g. in the form of a look-up table. Thus, in some embodiments involving a set of characteristic curves, the set of characteristic curves may be a predetermined set of characteristic curves stored in a memory (e.g. a memory 106 of the apparatus 100 or any other memory), e.g. in the form of a look-up table. In some embodiments, the set of characteristic curves may have been determined upfront (e.g. in a lab setting). In some embodiments, the set of characteristic curves may be determined using machine learning or deep learning. Thus, in some embodiments that employ machine learning or deep learning, a set of characteristic curves as a function of angle may be used, rather than a single characteristic curve. In some embodiments involving deep learning, the deep learning may be applied by feeding the training difference spectra and corresponding angles.

Multiple characteristics curves can be beneficial for different objects, such as for different people. For example, different people can have different skin types that may each have different characteristic curves so a suitable characteristic curve for a certain skin type may be selected from a set of characteristic curves. Thus, in some embodiments, the set of characteristic curves may comprise characteristic curves for different objects. For example, where the object is a person, the set of characteristic curves may comprise a characteristic curve for each of a plurality of different skin types (e.g. classified according to the Fitzpatrick Scale). Thus, the characteristic curve may be selected from the set of characteristic curves according to the skin type of the person. That is, the characteristic curve that corresponds to the skin type of the person may be selected. In this way, the first angle determination or the applied correction can be more accurate.

In some embodiments, the skin type of the person may be determined by way of any of the existing skin type determination techniques of which a person skilled in the art will be aware. In other embodiments, a user (e.g. the person or another user) of the apparatus 100 may input the skin type of the person, e.g. via a communications interface 110 of the apparatus 100. Although skin type is used as an example, the characteristic profile may be selected based on any other properties of the object.

In some embodiments, the one or more processors 102 of the apparatus 100 described herein may be configured to, for at least one pixel of the plurality of pixels corresponding to at least one other first point on the surface of the object, compare the set of intensity values for said at least one pixel to the characteristic curve for the object to determine a measure of similarity of the set of intensity values to the obtained characteristic curve. In these embodiments, the one or more processors 102 of the apparatus 100 described herein may also be configured to estimate at least one other first angle of the at least one other first point on the surface of the object corresponding to said at least one pixel from the determined measure of similarity. In some of these embodiments, the one or more processors 102 of the apparatus 100 may also be configured to derive an angular map comprising the estimated first angle and the estimated at least one other first angle. Thus, according to some embodiments, a first angle can be estimated for more than one point and an angular map can then be derived.

Figure 8:
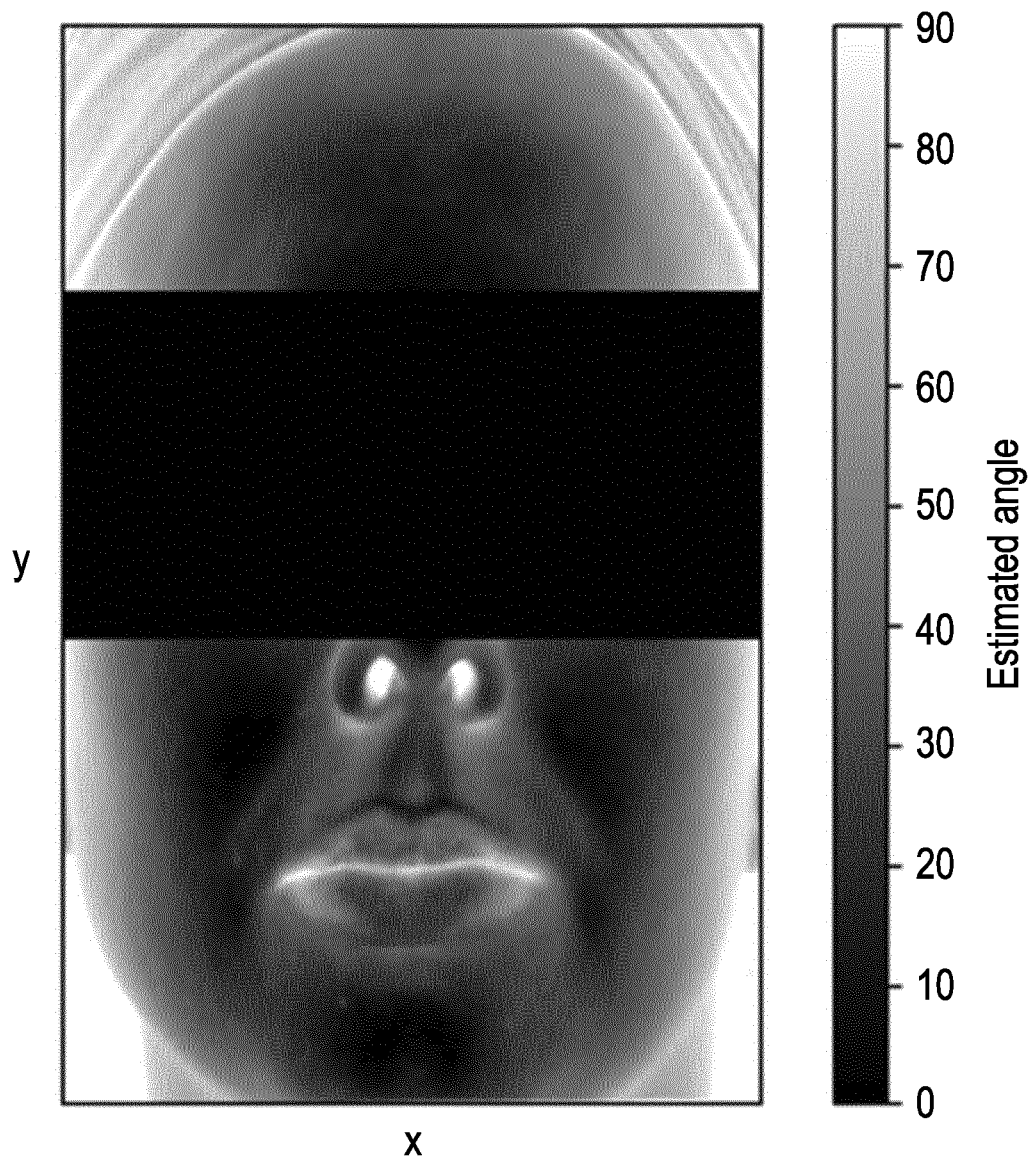
FIG. 8 is an example of a derived angular map.

FIG. 8 illustrates an example of a derived angular map. In this example, the object is a face of a subject. The eyes and area around the eyes are excluded from the map for privacy reasons. In FIG. 8, the x and y axis on the left denote the pixel position and the vertical axis on the right denotes the estimated angle (in degrees). In the derived angular map illustrated in FIG. 8, the darkest parts of the angular map represent at least one second point on the surface of the object at about 0 degrees with respect to (or parallel or substantially/approximately parallel to) the plane of the image or to the plane of an optical lens of the imaging sensor. Similarly, in the angular map illustrated in FIG. 8, the lightest parts of the angular map represent at least one third point on the surface of the object at about 90 degrees with respect to (or perpendicular or substantially/approximately perpendicular to) the plane of the image or to the plane of an optical lens of the imaging sensor. In some embodiments where an angular map is derived, the regression coefficient 'a' described earlier can be calibrated (e.g. scaled and/or clipped) to represent the actual angle using a single global gain parameter, e.g. such that the angle is close to 90 degrees for areas close to the edge.

In some embodiments in which an angular map is derived, the one or more processors 102 of the apparatus 100 described herein may be configured to estimate a depth map using the derived angular map. Thus, in some embodiments, the angular map may be converted to a 3D image. For example, the angular map may be converted to a depth map (or 3D image) by starting from the location where the angle is substantially or approximately 0 degrees (i.e. at a baseline location) and expanding outwards estimating how far adjacent points are translated in depth as a function of angle. Alternatively, in other embodiments, the angular map may be directly employed in the spectral decomposition process.

In some embodiments in which the object is skin, the one or more processors 102 of the apparatus 100 described herein may be configured to determine a concentration of chromophores in the skin from the multi-/hyperspectral two-dimensional image of the skin using the estimated first angle or from the multi-/hyperspectral two-dimensional image with the correction applied. A person skilled in the art will be aware of techniques that can be used to determine a concentration of chromophores in the skin.

However, one example is a decomposition algorithm, which consists of a model function f( ). The model function f( ) describes the theoretical (reflectance or absorbance) spectrum as a function of frequency for a given vector of chromophore concentrations c. Hence, f(c) maps to wavelength λ. Then, as an example, for each pixel position in the multi-/hyperspectral two-dimensional image, the following least squares error is minimized, using non-linear least squares optimization:

$$e[x,y] = \Sigma_{\forall \lambda} |s[\lambda,x,y] - f(c)|^2,$$

where s[λ, x, y] denotes the multi-/hyperspectral spectra, x is the x-coordinate in the multi-/hyperspectral two-dimensional image, y is the y-coordinate in the multi-/hyperspectral two-dimensional image, and λ is the wavelength index indicative of the wavelength of light.

This results in a vector of chromophore concentrations c that best matches the input spectrum. The input spectrum is the set of intensity values for said at least one pixel described earlier, where the set of intensity values correspond to the light intensity values for each of the plurality of wavelengths λ of light. More advanced models may incorporate the angle, meaning that the function f( ) not only has the chromophore concentrations c as input, but also the angle a. This results in minimization of the following least squares error:

$$e[x,y]=\Sigma_{\forall \lambda}|s[\lambda,x,y]-f(c,a[x,y])|^2,$$

where s[λ, x, y] denotes the multi-/hyperspectral spectra, x is the x-coordinate in the multi-/hyperspectral two-dimensional image, y is the y-coordinate in the multi-/hyperspectral two-dimensional image, and λ is the wavelength index indicative of the wavelength of light.

There is also provided a computer program product comprising a computer readable medium. The computer readable medium has a computer readable code embodied therein. The computer readable code is configured such that, on execution by a suitable computer or processor, the computer or processor is caused to perform the method described herein. The computer readable medium may be, for example, any entity or device capable of carrying the computer program product. For example, the computer readable medium may include a data storage, such as a ROM (such as a CD-ROM or a semiconductor ROM) or a magnetic recording medium (such as a hard disk). Furthermore, the computer readable medium may be a transmissible carrier, such as an electric or optical signal, which may be conveyed via electric or optical cable or by radio or other means. When the computer program product is embodied in such a signal, the computer readable medium may be constituted by such a cable or other device or means. Alternatively, the computer readable medium may be an integrated circuit in which the computer program product is embedded, the integrated circuit being adapted to perform, or used in the performance of, the method described herein.

There is thus provided herein an apparatus 100, method 200, and computer program product for estimating a first angle of a first point on a surface of an object from a multi-/hyperspectral two-dimensional image of the object at respective wavelengths or in applying a correction to the multi-/hyperspectral two-dimensional image, which addresses the limitations associated with the existing techniques. There is also provided herein an apparatus, method 300, and computer program product for determining a characteristic curve for use in estimating a first angle of a first point on a surface of an object from a multi-/hyperspectral two-dimensional image of the object at respective wavelengths or in applying a correction to the multi-/hyperspectral two-dimensional image.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An apparatus for estimating a first angle of a first point on a surface of an object, the apparatus comprising:
an imaging sensor comprising a plurality of pixels and a processor, wherein the imaging sensor is configured to: capture a multi-/hyperspectral two-dimensional image of the object at respective wavelengths and apply a correction to the multi-/hyperspectral two-dimensional image; acquire a multi-/hyperspectral two-dimensional image of an object at respective wavelengths, wherein the multi-/hyperspectral two-dimensional image at the respective wavelengths is formed of a plurality of pixels, each pixel having a set of intensity values corresponding to light intensity values for each of a plurality of wavelengths of light;
for at least one pixel of the plurality of pixels corresponding to a first point on a surface of the object, compare the set of intensity values for said at least one pixel to a characteristic curve for the object to determine a measure of similarity of the set of intensity values to the characteristic curve; and
wherein the processor is configured to estimate a first angle of the first point on the surface of the object corresponding to said at least one pixel from the determined measure of similarity, wherein the first angle is with respect to a plane of the image, and apply a correction based on the estimated first angle to the multi-/hyperspectral two-dimensional image at the first point on the surface of the object using the determined measure of similarity,
wherein the characteristic curve characterizes how the object reflects or absorbs light as a function of angle and is indicative of a difference between a spectrum of at least one second point on the surface of the object at a second angle with respect to the plane of the image and a spectrum of at least one third point on the surface of the object at a third angle with respect to the plane of the image, wherein the third angle is a known angle that is different from the second angle.

2. The apparatus as claimed in claim 1, wherein:
the characteristic curve is indicative of a difference between an average spectrum of at least two second points on the surface of the object at the second angle with respect to the plane of the image and a spectrum of at least two third points on the surface of the object at the third angle with respect to the plane of the image.

3. The apparatus as claimed in claim 1, wherein:
the second angle is about 0 degrees; and/or
the third angle is an angle in a range from 45 to 90 degrees.

4. The apparatus as claimed in claim 1, wherein:
the at least one second point on the surface of the object comprises at least one brightest point on the surface of the object; and/or
the at least one third point on the surface of the object comprises at least one dimmest point on the surface of the object.

5. The apparatus as claimed in claim 1, wherein:
the at least one second point on the surface of the object is identified by using landmark detection to detect the at least one second point on the surface of the object at the second angle with respect to the plane of the image; and/or
the at least one third point on the surface of the object is identified by using landmark detection to detect the at least one third point on the surface of the object at the third angle with respect to the plane of the image.

6. The apparatus as claimed in claim 1, wherein:
the characteristic curve is predetermined using at least one other multi-/hyperspectral two-dimensional image of the same type of object; or
the characteristic curve is determined using the multi-/hyperspectral two-dimensional image of the object.

7. The apparatus as claimed in claim 1, wherein the one or more processors are further configured to:
for at least one other pixel of the plurality of pixels corresponding to at least one other first point on the surface of the object, compare the set of intensity values for said at least one other pixel to the characteristic curve for the object to determine another measure of similarity of the set of intensity values to the obtained characteristic curve; and
estimate at least one other first angle of the at least one other first point on the surface of the object corresponding to said at least one other pixel from the determined another measure of similarity; and
derive an angular map comprising the estimated first angle and the estimated at least one other first angle.

8. The apparatus as claimed in claim 1, wherein:
the characteristic curve for the object is selected from a set of characteristic curves for a respective set of second and third angles.

9. The apparatus as claimed in claim 1, wherein:
the spectrum of the at least one second point comprises (1) a reflectance spectrum indicative of the portion of light reflected from the object at the at least one second point on the surface of the object at the second angle with respect to the plane of the image or (2) an absorbance spectrum indicative of the portion of light absorbed by the object at the at least one second point on the surface of the object at the second angle with respect to the plane of the image; and/or
the spectrum of the at least one third point comprises (1) a reflectance spectrum indicative of the portion of light reflected from the object at the at least one third point on the surface of the object at the third angle with respect to the plane of the image or (2) an absorbance spectrum indicative of the portion of light absorbed by the object by the object at the at least one third point on the surface of the object at the third angle with respect to the plane of the image.

10. The apparatus as claimed in claim 1, wherein the object is skin and the one or more processors are configured to:
determine a concentration of chromophores in the skin from the multi-/hyperspectral two-dimensional image of the skin using the estimated first angle or from the multi-/hyperspectral two-dimensional image with the correction applied.

11. The apparatus of claim 1, wherein the imaging sensor comprises a multi-/hyperspectral camera.

12. A method for estimating a first angle of a first point on a surface of an object from a multi-/hyperspectral two-dimensional image of the object at respective wavelengths or applying a correction to the multi-/hyperspectral two-dimensional image, the method comprising:
acquiring from an imaging sensor, which comprises a plurality of pixels and a processor, a multi-/hyperspectral two-dimensional image of an object at respective wavelengths, wherein the multi-/hyperspectral two-dimensional image at the respective wavelengths is formed of a plurality of pixels, each pixel having a set of intensity values corresponding to light intensity values for each of a plurality of wavelengths of light;
for at least one pixel of the plurality of pixels corresponding to a first point on a surface of the object, comparing the set of intensity values for said at least one pixel to a characteristic curve for the object to determine a measure of similarity of the set of intensity values to the characteristic curve; and
estimating with the processor a first angle of the first point on the surface of the object corresponding to said at least one pixel from the determined measure of similarity, wherein the first angle is with respect to a plane of the image, and applying a correction based on the estimated first angle to the multi-/hyperspectral two-dimensional image at the first point on the surface of the object using the determined measure of similarity, wherein the characteristic curve characterizes how the object reflects or absorbs light as a function of angle and is indicative of a difference between a spectrum of at least one second point on the surface of the object at a second angle with respect to the plane of the image and a spectrum of at least one third point on the surface of the object at a third angle with respect to the plane of the image, wherein the third angle is a known angle that is different from the second angle.

13. The method of claim 12, wherein the imaging sensor comprises a multi-/hyperspectral camera.

14. A tangible, non-transitory computer readable medium, the computer readable medium having a computer readable code embodied therein, the computer readable code being configured such that, on execution by a computer or processor, the computer or processor is caused to:
acquire from an imaging sensor comprising a plurality of pixels and a processor, a multi-/hyperspectral two-dimensional image of an object at respective wavelengths, wherein the multi-/hyperspectral two-dimensional image at the respective wavelengths is formed of a plurality of pixels, each pixel having a set of intensity values corresponding to light intensity values for each of a plurality of wavelengths of light;
for at least one pixel of the plurality of pixels corresponding to a first point on a surface of the object, comparing the set of intensity values for said at least one pixel to a characteristic curve for the object to determine a measure of similarity of the set of intensity values to the characteristic curve; and
estimate with the processor a first angle of the first point on the surface of the object corresponding to said at least one pixel from the determined measure of similarity, wherein the first angle is with respect to a plane of the image, and applying a correction based on the estimated first angle to the multi-/hyperspectral two-dimensional image at the first point on the surface of the object using the determined measure of similarity, wherein the characteristic curve characterizes how the object reflects or absorbs light as a function of angle and is indicative of a difference between a spectrum of at least one second point on the surface of the object at a second angle with respect to the plane of the image and a spectrum of at least one third point on the surface of the object at a third angle with respect to the plane of the image, wherein the third angle is a known angle that is different from the second angle.

15. The tangible, non-transitory computer readable medium as claimed in claim 14, wherein:
the characteristic curve is indicative of a difference between an average spectrum of at least two second points on the surface of the object at the second angle with respect to the plane of the image and a spectrum of at least two third points on the surface of the object at the third angle with respect to the plane of the image.

16. The tangible, non-transitory computer readable medium as claimed in claim 14, wherein:
   the second angle is about 0 degrees; and/or
   the third angle is an angle in a range from 45 to 90 degrees.

17. The tangible, non-transitory computer readable medium as claimed in claim 14, wherein:
   the at least one second point on the surface of the object comprises at least one brightest point on the surface of the object; and/or
   the at least one third point on the surface of the object comprises at least one dimmest point on the surface of the object.

18. The tangible, non-transitory computer readable medium as claimed in claim 14, wherein:
   the at least one second point on the surface of the object is identified by using landmark detection to detect the at least one second point on the surface of the object at the second angle with respect to the plane of the image; and/or
   the at least one third point on the surface of the object is identified by using landmark detection to detect the at least one third point on the surface of the object at the third angle with respect to the plane of the image.

19. The tangible, non-transitory computer readable medium as claimed in claim 14, wherein:
   the characteristic curve is predetermined using at least one other multi-/hyperspectral two-dimensional image of the same type of object; or
   the characteristic curve is determined using the multi-/hyperspectral two-dimensional image of the object.

20. The tangible, non-transitory computer readable medium as claimed in claim 14, wherein the computer readable code embodied upon execution by computer or processor, further cause the computer or processor to:
   for at least one other pixel of the plurality of pixels corresponding to at least one other first point on the surface of the object, compare the set of intensity values for said at least one other pixel to the characteristic curve for the object to determine another measure of similarity of the set of intensity values to the characteristic curve; and
   estimate at least one other first angle of the at least one other first point on the surface of the object corresponding to said at least one other pixel from the determined another measure of similarity; and
   derive an angular map comprising the estimated first angle and the estimated at least one other first angle.

* * * * *